(12) United States Patent
Mu et al.

(10) Patent No.: US 10,481,699 B2
(45) Date of Patent: Nov. 19, 2019

(54) ARMBAND FOR TRACKING HAND MOTION USING ELECTRICAL IMPEDANCE MEASUREMENT

(71) Applicant: Facebook Technologies, LLC, Menlo Park, CA (US)

(72) Inventors: Beipeng Mu, Redmond, WA (US); Renzo De Nardi, Seattle, WA (US); Richard Andrew Newcombe, Seattle, WA (US); Raymond King, Redmond, WA (US); Evan Paul Gander, Seattle, WA (US); Robert Y. Wang, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 8 days.

(21) Appl. No.: 15/661,317

(22) Filed: Jul. 27, 2017

(65) Prior Publication Data
US 2019/0033974 A1 Jan. 31, 2019

(51) Int. Cl.
| | |
|---|---|
| *G06F 3/01* | (2006.01) |
| *G06F 3/0346* | (2013.01) |
| *G06T 7/73* | (2017.01) |
| *G06K 9/00* | (2006.01) |

(52) U.S. Cl.
CPC .............. *G06F 3/017* (2013.01); *G06F 3/011* (2013.01); *G06F 3/016* (2013.01); *G06F 3/0346* (2013.01); *G06K 9/00355* (2013.01); *G06T 7/74* (2017.01); *G06T 2207/20081* (2013.01); *G06T 2207/30196* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,835,077 A | * | 11/1998 | Dao ......................... | G01C 9/00 345/157 |
| 2009/0326406 A1 | | 12/2009 | Tan et al. | |
| 2011/0304541 A1 | | 12/2011 | Dalal | |
| 2013/0077820 A1 | | 3/2013 | Marais et al. | |
| 2013/0265241 A1 | | 10/2013 | Thörn | |
| 2014/0118931 A1 | * | 5/2014 | Hata ..................... | G06F 1/1626 361/688 |

(Continued)

FOREIGN PATENT DOCUMENTS

WO  WO 2015/138448 A1  9/2015

OTHER PUBLICATIONS

510(k) Summary of Safety & Effectiveness, Ultrasound Transducer Standoff, CIVCO Medical Instruments, Aug. 17, 1999, 9 pages.

(Continued)

*Primary Examiner* — Van N Chow
(74) *Attorney, Agent, or Firm* — Fenwick & West LLP

(57) ABSTRACT

A system includes a wearable device including sensors arranged at different locations on the wearable device. Each sensor measures electrical signals transmitted from a wrist or arm of a user. A position computation circuit is coupled to the sensors. The position computation circuit computes, using information derived from the electrical signals with a machine learning model, an output that describes a hand position of a hand of the wrist or arm of the user.

35 Claims, 9 Drawing Sheets

(56) References Cited

U.S. PATENT DOCUMENTS

| | | | |
|---|---|---|---|
| 2014/0196131 A1* | 7/2014 | Lee | G06F 21/35 |
| | | | 726/7 |
| 2014/0198035 A1 | 7/2014 | Bailey et al. | |
| 2015/0169074 A1 | 6/2015 | Ataee et al. | |
| 2015/0301608 A1 | 10/2015 | Nagaraju et al. | |
| 2015/0309582 A1* | 10/2015 | Gupta | G06F 3/011 |
| | | | 345/156 |
| 2016/0048231 A1 | 2/2016 | Kristensson et al. | |
| 2016/0240154 A1* | 8/2016 | Forutanpour | G06F 3/0412 |
| 2016/0313801 A1 | 10/2016 | Wagner et al. | |
| 2017/0055938 A1 | 3/2017 | Krasnow | |
| 2017/0095157 A1* | 4/2017 | Tzvieli | A61B 5/0077 |
| 2017/0323133 A1 | 11/2017 | Tsai | |
| 2017/0045946 A1 | 12/2017 | Smoot et al. | |

OTHER PUBLICATIONS

Fukui, R. et al., "Hand Shape Classification with a Wrist Contour Sensor: Development of a Prototype Device," UbiComp '11, ACM, Sep. 17-21, 2011, 4 pages.

Georgi, M. et al., "Recognizing Hand and Finger Gestures with IMU Based Motion and EMG Based Muscle Activity Sensing," Proceedings of the International Conference on Bio-inspired Systems and Signal Processing (BIOSIGNALS-2015), SCITEPRESS (Science and Technology Publications, Lda.), 2015, pp. 99-108.

Halter, R.J. et al., "A Broadband High-Frequency Electrical Impedance Tomography System for Breast Imaging," IEEE Transactions on Biomedical Engineering, Feb. 2008, pp. 650-659, vol. 55, No. 2.

Nelson, C.M. et al., "In Vivo Measurements of Biceps Brachii and Triceps Brachii Fascicle Lengths Using Extended Field-of-View Ultrasound," Journal of Biomechanics, 2016, pp. 1948-1952, vol. 49.

Zhang, Y. et al., "Advancing Hand Gesture Recognition with High Resolution Electrical Impedance Tomography," UIST 2016, ACM, Oct. 16-19, 2016, pp. 843-850.

Zhang, Y. et al., "Tomo: Wearable, Low-Cost, Electrical Impedance Tomography for Hand Gesture Recognition," UIST '15, ACM, Nov. 8-11, 2015, 7 pages.

PCT International Search Report and Written Opinion, PCT Application No. PCT/US2018/043943, dated Nov. 7, 2018, 21 pages.

Freudenrich, C.C., "How Ultrasound Works," undated, 5 pages, May be Retrieved at <URL:http://electronics.howstuffworks.com/ultrasound.htm>.

Mourad, P.D. et al., "A Novel Device for Tracking Finger Movement Using Non-Imaging Ultrasound," undated, 4 pages.

"Myo Gesture Control Armband | Wearable Technology by Thalmic Labs," Thalmic Labs Inc., 2013-2016, 6 pages, [Online] [Retrieved on Oct. 18, 2017] Retrieved from the Internet<URL:https://www.myo.com/>.

Rovner, A., "The Principle of Ultrasound From ECHOpedia, Physics of Ultrasound as it Relates to Echocardiography," Jan. 23, 2017, 21 pages, May be Retrieved at <URL:http://www.echopedia.org/wiki/The_principle_of ultrasound>.

United States Office Action, U.S. Appl. No. 15/727,412, dated Dec. 7, 2018, 19 pages.

YouTube Video: Zhang, Y. et al., "Tomo: Wearable, Low-Cost Electrical Impedance Tomography for Hand Gesture Recognition," Oct. 25, 2015, May be Retrieved at<URL:https://www.youtube.com/watch?v=FqgwBc7cGZ8>.

YouTube Video: Ogata, M. et al., "SkinWatch: Skin Gesture Interaction for Smart Watch," Feb. 24, 2015, May be Retrieved at<URL:https://www.youtube.com/watch?v=oZIgJU-dv9k>.

* cited by examiner

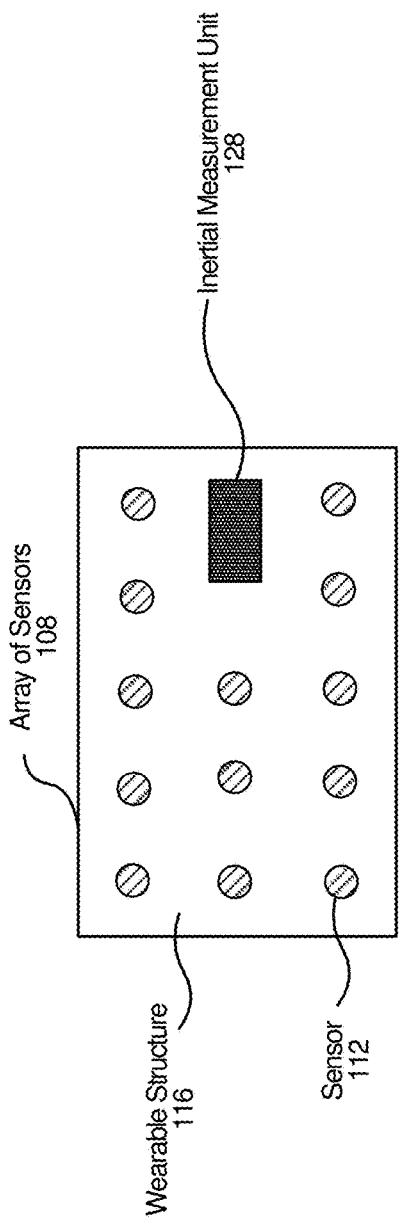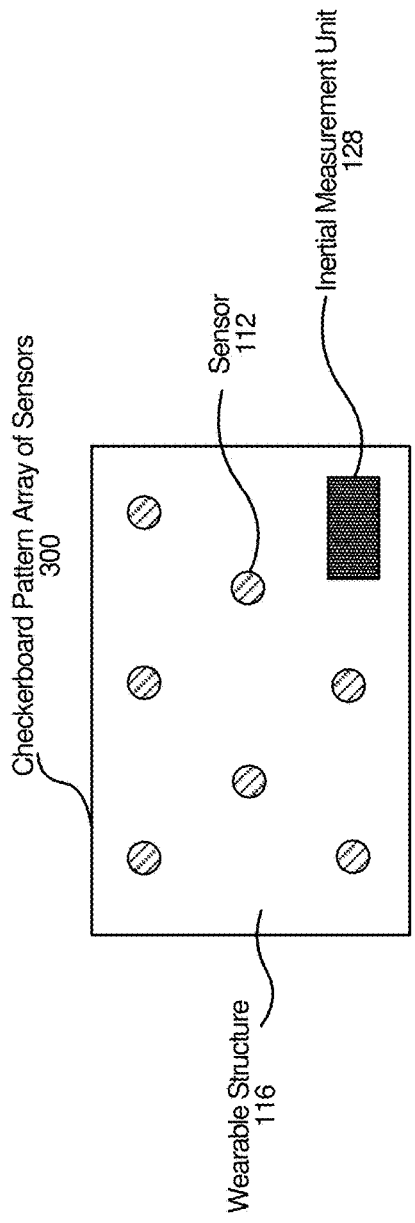
FIG. 3A
FIG. 3B

ARMBAND FOR TRACKING HAND MOTION USING ELECTRICAL IMPEDANCE MEASUREMENT

BACKGROUND

Field of the Disclosure

The present disclosure generally relates to tracking of body motions using sensors, and specifically to tracking of human hand positions using electrical impedance measurement.

Description of the Related Arts

Bodily motion such as gestures can be an appealing way for a user to interact with computing devices, since gestures are already a natural part of how people communicate. A hand gesture tracking device may enable a user to control or interact with computing devices without physically touching them. For example, a gesture tracking device may be used by a user to control memory or display devices in a local or remote environment.

Gesture recognition systems can be unwieldy, constraining, and uncomfortable to use. For example, glove-like devices that use mechanical signals to track hand motion may disturb the haptic sense of the hand. They may also be difficult to customize to different users having varying hand size. Camera-based gesture tracking systems detect the user's hand area from captured images, but often require the user's entire hand to be in the camera view range. They may also suffer failure when there is object occlusion in an image.

Gesture trackers are thus awkward to use, difficult to manage, and subject to distortion from the system arrangement or surrounding environment. The cost of traditional gesture trackers may also be high, thus limiting user adoption rate. Furthermore, gesture recognition systems are limited to a small set of predefined gestures. For these and other reasons, such gesture recognition systems are unsuitable for effective hand tracking for head-mounted displays (HMDs).

SUMMARY

Embodiments relate to a wearable device for tracking human hand motion using electrical impedance measurement of the user's arm. Sensors located on the wearable device receive electrical signals from the user's wrist or arm corresponding to a hand position of the user. Information is extracted from the electrical signals (e.g., impedance values indicating the state of the user's arm structures such as tendons, and thus also indicating the hand position or pose of the user). The impedance or other extracted values from the electrical signals may be used as input to a position computation circuit implementing a machine learning model. The position computation circuit determines the hand position of the user from the inputs using the machine learning model. In some embodiments, the wearable device includes an inertial measurement unit (IMU) that measures motion of the user's arm, and provides inertial signals to the position computation circuit as an input for determination of the hand position. In some embodiments, the machine learning model is trained using ground truth hand positions extracted from video images of the user's hand taken concurrently with the capture of the electronic signals.

In one embodiment, a system includes a wearable device including sensors arranged on the wearable device. Each sensor measures electrical signals transmitted from a wrist or arm of a user. A position computation circuit is coupled to the sensors. The position computation circuit computes, using information derived from the electrical signals with a machine learning model, an output that describes a hand position of a hand of the wrist or arm of the user.

In one embodiment, the position computation circuit is located in the wearable device.

In one embodiment, the position computation circuit is located in a host system or other computing device external to the wearable device.

In one embodiment, each sensor includes an electrode and a conductive agent located between the electrode and the wrist or arm of the user. Each sensor can transmit an alternative current (AC) signal, a direct current (DC) signal, or a wide-bandwidth AC signal including multiple frequencies.

In one embodiment, the sensors are arranged in a grid array or a checkerboard pattern.

In one embodiment, the information derived from the electrical signals includes aggregate values based on an electrical impedance measured between each pair of sensors. The electrical impedance is determined based on probe signals transmitted into the user's wrist or arm by the pair of sensors and the measured electrical signals. In one embodiment, the derived information may include a shape of a wave of the electrical signals, a frequency-domain representation of the electrical signals, or a time-domain sample of the electrical signals.

In one embodiment, the position computation circuit extracts features from the information derived from the electrical signals. The features include one or more of angles between joints defining the hand position of a hand of the wrist or arm of the user, and a reduced representation of a change in the hand position of a hand of the wrist or arm of the user. The reduced representation defines a difference between a present hand position of the hand of the wrist or arm of the user from a previous hand position of the hand of the wrist or arm of the user.

In one embodiment, each sensor further transmits a probe signal into the user's wrist or arm by varying a time period of the probe signal, an amplitude of the probe signal, or a phase of the probe signal.

In one embodiment, a first sensor transmits a probe signal into the user's wrist or arm by staggering the transmission of the probe signal with respect to transmission of other probe signals by other sensors.

In one embodiment, an inertial measurement unit generates inertial signals corresponding to movement of the wearable device, and the user's arm. The position computation circuit further computes, using information derived from the inertial signals with the machine learning model, the output that describes the hand position of the hand of the wrist or arm of the user.

In one embodiment, the inertial measurement unit includes one or more of a gyroscope, an accelerometer, and a magnetometer.

In one embodiment, one or more cameras generate image signals of the user's hand, such as images that show the hand position from one or multiple angles. The position computation circuit further computes, using information derived from the image signals with the machine learning model, the output that describes the hand position of the hand of the wrist or arm of the user.

In one embodiment, the camera is a depth camera, a Red-Green-Blue (RGB) camera, an Infrared camera, or a camera mounted on an HMD.

In one embodiment, an inertial measurement unit generates inertial signals corresponding to movement of the wearable device. The position computation circuit further trains the machine learning model to generate, using information derived from the inertial signals, the output that describes the hand position of the hand of the wrist or arm of the user.

In one embodiment, a camera generates image signals of the hand of the wrist or arm of the user. The position computation circuit further trains the machine learning model to generate, using information derived from the image signals with the machine learning model, the output that describes the hand position of the hand of the wrist or arm of the user.

In one embodiment, the computed output further describes forces exerted by the hand of the user on objects touching the hand of the user. The structures of the user's arm, such as the tendons, are in different states when the hand is exerting force compared with when the hand is relaxed even if the overall position of the hand looks similar. The use of electrical signals for hand tracking thus allows for even more types of data extraction than possible with other types of sensor tracking systems.

In one embodiment, the position computation circuit further receives image signals from a camera mounted on an HMD. Comparison signals are determined by comparing the image signals with the computed output. The comparison signals are transmitted to a host system.

In one embodiment, the computed output includes parameters of a hand shape model. The parameters correspond to joints of the hand of the wrist or arm of the user, edges between pairs of the joints, angles between pairs of the edges, and a mesh including vertices and for each vertex, a distance between the vertex and one or more joints.

BRIEF DESCRIPTION OF THE DRAWINGS

The teachings of the embodiments can be readily understood by considering the following detailed description in conjunction with the accompanying drawings.

FIG. 3A is an example view of an array of sensors, in accordance with an embodiment.

FIG. 3B is an example view of a checkerboard pattern of sensors, in accordance with an embodiment.

The figures depict various embodiments for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to a wearable device for tracking human hand motion using electrical impedance measurement. Sensors located on the device may transmit probe signals to the internal structures, such as tendons and muscles, of a user's arm and receive electrical signals from the user's arm. In particular, the internal structures of the arm and their state alter the probe signals, resulting in different electrical signals being received by the sensors. In another example, the sensors measure impedance of the user's arm and internal structures without using a probe signal. The received electrical signals can vary, and correspond to the hand position of the user. Features may be extracted from the electrical signals. For example, the electrical signals can be processed by a neural network using a machine learning model, which may be trained for each user, to programmatically detect the hand position that corresponds to the electrical signals.

Example View of Wearable Device

Figure 1:
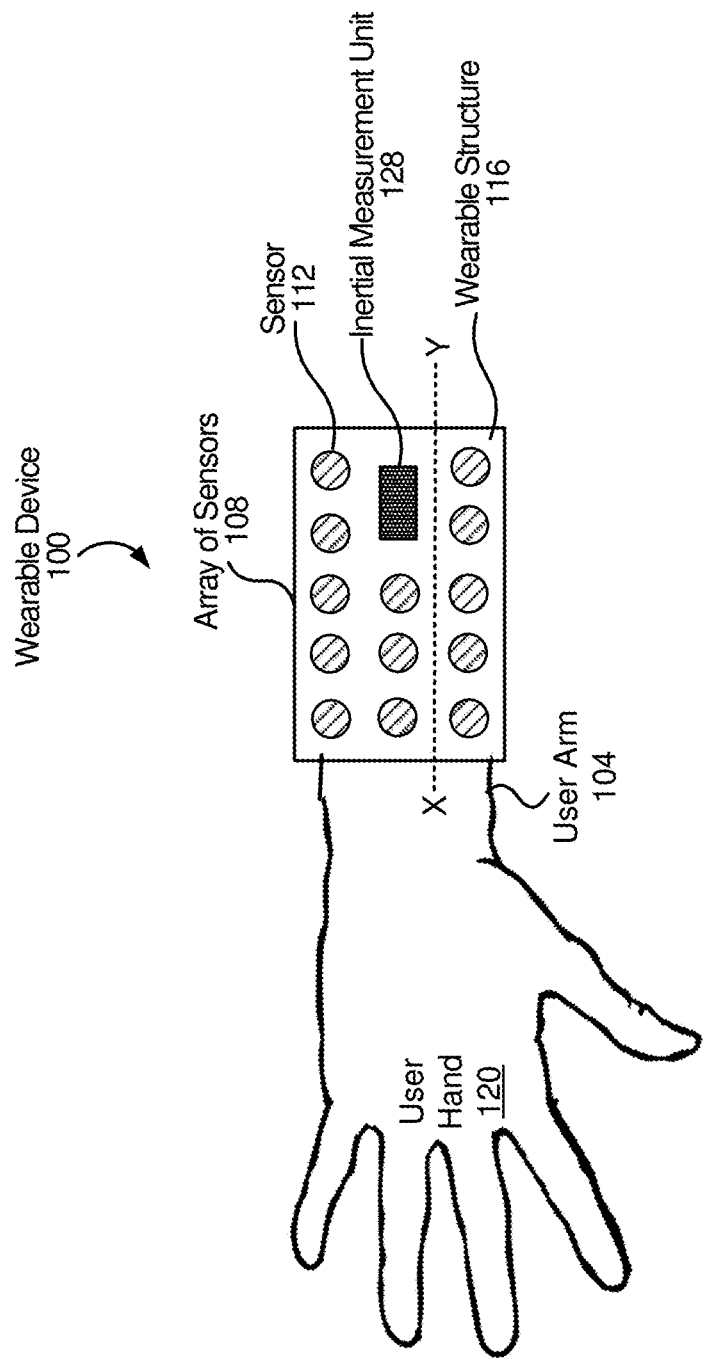
FIG. 1 is an example view of a wearable device including an array of sensors, in accordance with an embodiment.

FIG. 1 is an example view of a wearable device 100 including an array of sensors 108, in accordance with an embodiment. The wearable device 100 includes a wearable structure 116 that may be a flexible mechanical substrate such as a plastic (e.g., polyethylene or polypropylene), rubber, nylon, synthetic, polymer, etc. The wearable structure 116 is configured to be worn around at least a portion of a user's wrist or arm 104. The wearable device 100 includes sensors 112 arranged at different locations on the wearable structure 116. For example, the sensors can be arranged in a pattern along an inner surface of the wearable structure 116 facing the arm 104 such that the sensors are in electrical contact with the arm 104.

Each sensor 112 measures electrical signals corresponding to movement or state of internal bodily structures within the user's wrist or arm 104. In some embodiments, the sensors 112 include electrodes mounted on the wearable structure 116 to measure electrical impedance of the user's wrist or arm 104.

In some embodiments, an inertial measurement unit 128 is fixed to the wearable structure 116 and generates inertial signals corresponding to movement of the inertial measurement unit 128, and thus movement of the user's arm 104. The wearable structure 116 secures the wearable device 100 to the user's wrist or arm 104. In some embodiments, some or all of the wearable structure 116 may be a rigid material rather than a flexible material. For example, the wearable structure 116 may include a rigid body portion that includes the sensors 112, and a band portion that secures the body portion to the user's arm 104. In some embodiments, the wearable device 100 does not include the inertial measurement unit 128.

The wearable device 100 is placed on a user's arm 104 to detect a hand position of a hand 120 of the user. A hand position includes the angle and position of the palm, knuckles, and fingers of the user's hand and includes parameters corresponding to joints of the hand, edges between pairs of the joints, and angles between pairs of the edges, as illustrated and described in detail below with respect to FIG. 2C. Each sensor 112 on the wearable device 100 may function individually to receive electrical signals through the arm 104. In another example, pairs of sensors operate together, with some sensors transmitting probe signals and some sensors receiving the electrical signals. The sensors 112 receive electrical signals from the user's arm 104 representing the position of the user's hand 120.

The wearable device 100 may be portable, light weight, and low power, and is suitable for use as a game controller, media controller, keyboard controller, robotic device controller, etc. The wearable device 100 may include micro-USB, Bluetooth®, or Wi-Fi connectivity to interface with a computing device, a VR system, or an HMD. In some embodiments, the wearable device 100 may be used to render a full hand model in a VR system or track human-object interaction in real environments.

In some embodiments, the sensors 112 include electrodes that use electrical impedance tomography (EIT) to generate inputs used to determine the hand position of the user's hand 120. EIT is a noninvasive method in which electrical conductivity, permittivity, or impedance of the user's hand 120 may be inferred from surface electrode measurements. The wearable device 100 may apply AC signals at a single frequency or use multiple frequencies to better differentiate between tissues within the user's hand 120. In some embodiments, the AC signals correspond to wide-bandwidth signals comprising a spectrum of frequencies.

AC signals may be applied to some or all of the sensors 112 and resulting voltages may be received by the sensors 112. The resulting impedances and their phases are determined from the currents and the voltages measured. Different values of impedance correspond to different states or arrangements of the internal structures (e.g., joints, bones, tendons, etc.,) of the user's wrist or arm, and thus different hand positions. This process may be repeated to generate a set of measurements of voltages and/or currents by the sensors 112. The sensors 112 can be arranged in different configurations, as illustrated and described below with reference to FIGS. 2A, 2B, 3A, 3B, and 3C. In some embodiments, each sensor 112 and the inertial measurement unit 128 is mounted on the wearable structure 116 which wraps around the user's arm 104 to ensure the array of sensors 108 covers and can receive electrical signals from different areas of the user's arm 104, as illustrated and described below with reference to FIG. 2B.

In some embodiments, the sensors 112 include electrodes designed to make contact with human skin. The electrodes may be circular, square, or rectangular, and may range in diameter or linear dimension. In some embodiments, the electrodes may range in size from 1-10 mm. The electrodes may be made of a metallic material, such as Ag—AgCl or a stretchable conductive polymer, such as (3,4-ethylenedioxythiophene) (PEDOT) mixed with polyurethane (PU). The electrodes may be fabricated using an Ag-plated polyvinylidene fluoride (PVDF) nanofiber web and metallic threads. A contact area having a conductive agent and padding may be used on the wearable device 100 behind each electrode to improve subject comfort and reduce contact impedances. The conductive agent between the electrode and skin may be a "wet" connection using a conductive gel, which may consist of propylene glycol and NaCl, or a "dry" connection, such as a thin layer of conductive polymer (e.g., carbon-doped PDMS).

In some embodiments, the electrodes may drive AC signals of a few milliamperes at a frequency of 10-100 kHz into the user's arm 104 and then measure the resulting voltage or current to determine impedance values and the phase of the impedance. In some embodiments, the electrodes may transmit AC signals corresponding to wide-bandwidth signals including a plurality of frequencies that include the MHz domain.

The inertial measurement unit 128 generates information that indicates motion of the user's arm 104. The inertial measurement unit 128 may include a gyroscope, an accelerometer, and/or a magnetometer. The inertial measurement unit 128 measures and reports forces, an angular velocity, and/or a magnetic field surrounding the user's hand 120 or arm 104. For example, the inertial measurement unit 128 detects linear acceleration using one or more accelerometers and rotational rate using one or more gyroscopes. An example configuration of the inertial measurement unit 128 may contain one accelerometer, gyrometer, and magnetometer per axis for each of the three axes: pitch, roll and yaw. The wearable device 100 may detect that the user's arm 104 is moving and, combined with the electrical signals from the sensors 112, improves the identification of the user hand position and facilitates gesture identification. The generated inertial signals may be a current, voltage, or digital data.

Example Cross Sectional View of Tracking Armband

Figure 2A:
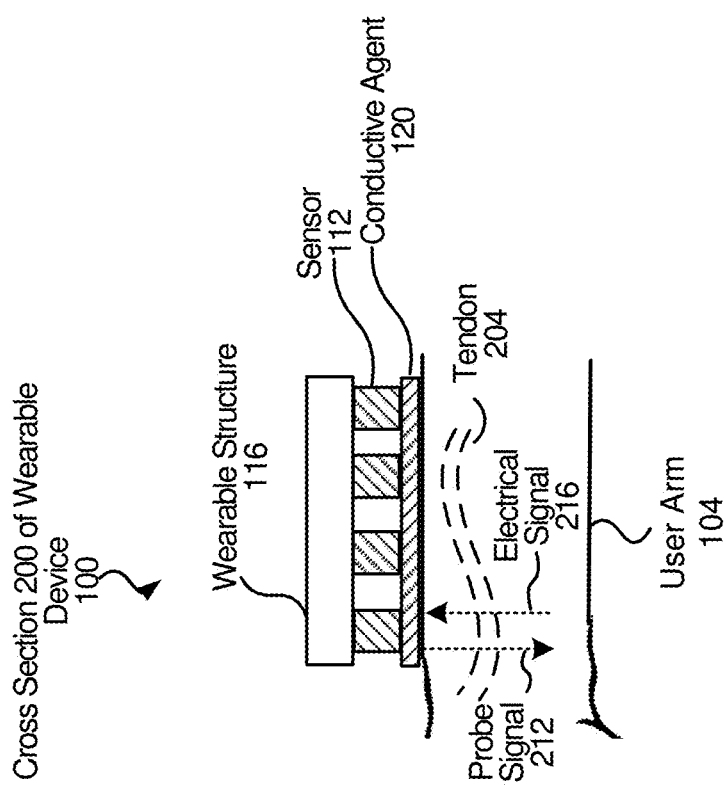
FIG. 2A is an example cross sectional view of the wearable device taken along line XY in FIG. 1, in accordance with an embodiment.

FIG. 2A is an example cross sectional view 200 of the wearable device 100 taken along the XY line shown in FIG. 1, in accordance with an embodiment. The cross sectional view 200 shows the user's arm 104 and a tendon 204 within the user's arm 104.

The wearable device 100 is worn on the user's wrist or arm 104 with the sensors 112 transmitting a probe signal 212 via a conductive agent 120 through the arm 104. The conductive agent 120 reduces the impedance presented to the probe signals 212 at the contact between the sensors 112 and the skin of the arm 104. In some embodiments, the array 108 of sensors 112 does not fully wrap around the wrist or arm 104, and may be arranged only on the palm side of the wrist or arm 104 as shown in FIG. 2A. The probe signal 212 may pass through internal structures of the arm 104, such as the tendon 204, and detected by the sensor 112 shown (or another sensor 112) as the electrical signal 216. Sensor 112 may include an electrode that transmits AC signals or DC signals into the wrist or arm 104 of the user as the probe signal 212.

In some embodiments, the probe signals 212 are wide-bandwidth AC signals including a range of frequencies. For example, the probe signals 212 may be spread in the frequency domain, resulting in signals 212 with a wider bandwidth. Among other things, the use of wide-bandwidth signals decreases the effects from signal interference. In some embodiments, the probe signals 212 may be DC signals produced by a power supply such as a battery and having a fixed magnitude (amplitude).

In some embodiments, the probe signals 212 may have a time-varying waveform such as a sinusoidal waveform or AC waveform. For example, the probe signal 212 may continuously change polarity every half cycle alternating between a positive maximum value and a negative maximum value respectively with regards to time. The time period of the probe signal 212 is the length of time in seconds that the waveform takes to repeat itself from start to finish. The amplitude is the magnitude or intensity of the signal waveform measured in volts or amps. The phase of each probe signal 212 is measured relative to a common reference such as ground or the probe signal of another sensor. Due to the phase difference, the electrical signal 216 on any sensor reaches a peak value at a different time after one of the other sensors. In some embodiments, each sensor 112 further transmits the probe signals 212 into the user's wrist or arm 104 by varying one or more of a time period of the probe signal 212, an amplitude of the probe signal 212, and a phase of the probe signal 212.

In some embodiments, the sensors 112 transmit probe signals 212 into the user's wrist or arm 104 in a staggered manner, where a different subset of the sensors transmit probe signals 112 at different times. The probe signals 212 from two or more sensors 112 can transmit alternating currents of typically a few milliamperes at a frequency of 10-100 kHz. The remaining sensors may be used to measure the resulting voltage signal 216. This procedure may then be repeated for multiple stimulation patterns defining an order of pairs of sensors selected to emit the probe signals 212. In some embodiments, a single current source is switched between multiple sensors 112 using a multiplexer to generate the probe signals 212. In some embodiments, a system of voltage-to-current converters, one for each sensor 112, each controlled by a digital to analog converter, is used to generate the probe signals 212

Each electrical signal 216 may include, if the probe signal 212 is an AC signal, properties such as a voltage and a phase of the voltage, or an electric current and a phase of the electric current. If a DC signal is used for the probe signal 212, the electrical signal 216 includes a magnitude of a DC signal. The electrical signal 216 measurements may be taken either by a single voltage measurement circuit multiplexed over the sensors 112 or a separate circuit for each sensor 112. In some embodiments, an analog demodulation circuit may be used to convert the alternating voltage to a DC level before further processing by an analog to digital converter. In some embodiments, the alternating signal may be converted directly before performing digital demodulation. The device 100 may operate at multiple frequencies and measure both magnitude and phase of the voltage of the electrical signal 216. The impedances derived from the electrical signal 216 may be passed on to a computing device (e.g., a separate host system or a processor integrated with the wearable device 100) to perform image reconstruction and display based at least in part on the electrical signal 216.

In some embodiments, phase data of the electrical impedance between each pair of sensors 112 is extracted from the measured electrical signal 216 between the pair of sensors. The impedance data stream transmitted from the sensors to a position computation circuit includes sets of pairwise impedance measurements from each pair of sensors. Each combination of sensors is used to perform pairwise measurements that, if the number of sensors is denoted by N, result in $N^2$ impedance values. In some embodiments, the information extracted from the measured electrical signals 216 includes a change in impedance over time for each pair of sensors (impedance/s). This impedance/s is indicative of changes in the state of the user's arm 104 over time, and thus is used to determine the user hand position.

The sensors 112 are arranged on the wearable structure 116 across the user's wrist or arm 104 to detect the state of the soft tissue, such as the tendon 204. The wearable device 100 may measure any or all of muscle contractions, tendon 204 motion, tendon 204 length, and joint stiffness in order to determine the hand position of the user's hand 120. For example, combinations of such values measured from the user's arm 104 can indicate the angle formed by bones between joints within the user's hand 120. The position of the hand can be represented by a collection of values representing the angles formed between joints in the hand as derived from the electrical signal 216.

The wearable device 100 operates by determining the state of structures within the arm 104 that is connected to the hand 120 by the wrist. For example, the state of bones such as the radius and ulna, the radial styloid and the ulnar styloid, the carpal bones, the metacarpals, etc., may be determined to identify the position of the user's hand 120. The state of joints such as the carpometacarpophalangeal joint, the metacarpophalangeal joint, and the interphalangeal joint, etc., may be determined from the electrical signals 216 to identify the position of the user's hand 120. The state of muscles such as intrinsic muscles, tendons such as the flexor tendons, extensor tendons, tendon sheaths, and median nerve and ulnar nerve may be determined from the electrical signals 216 to identify the position of the user's hand 120. Among other advantages, the wearable device 100 can determine user hand pressure when holding objects and can distinguish between a user who is grasping an object in the hand 120 and a user who is making a grasping gesture with an empty hand 120.

Figure 2B:
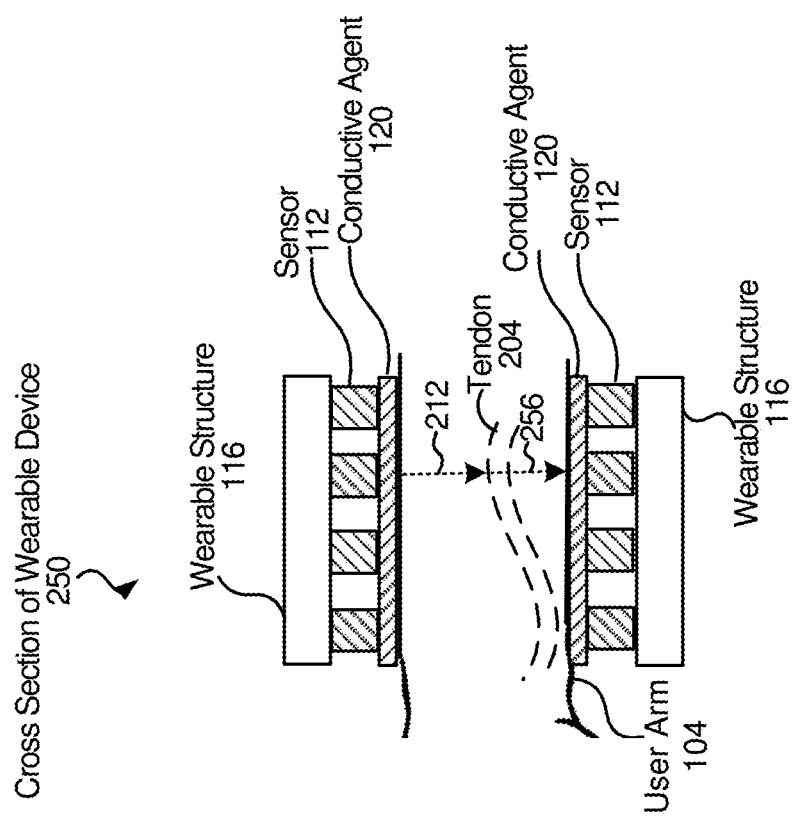
FIG. 2B is an example cross sectional view of a wearable device having sensors surrounding a user's arm, in accordance with an embodiment.

FIG. 2B is an example cross sectional view of a wearable device 250 having sensors 112 surrounding the user's arm 104, in accordance with an embodiment. The wearable structure 116 wraps around the wrist or arm 104 of the user. The sensors on one side of the arm 104 may transmit probe signals 212 into the user's arm and sensors on another side of the arm 104 may receive electrical signals 256 traveling through the tendon 204 of the user's arm 104. In this manner, the system is able to measure cross-sectional impedance properties of the wrist or arm 104.

Example Hand Shape Model

Figure 2C:
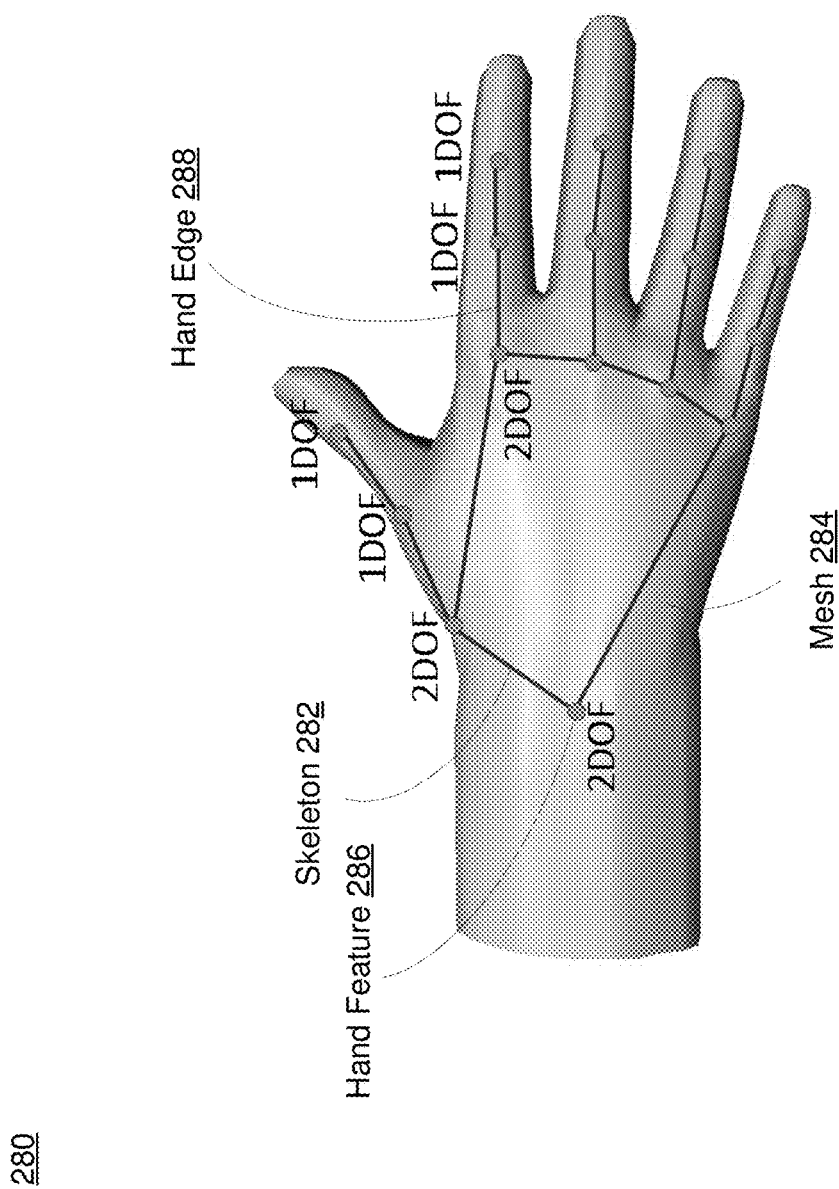
FIG. 2C is an example illustration of a hand shape model of a user, in accordance with an embodiment.

FIG. 2C is an example illustration of a hand shape model 280 of a user, in accordance with an embodiment. In some embodiments, the hand position of the user is represented with reference to the hand shape model 280. The hand shape model 280 includes parameters that correspond to joints of the hand 120 of the wrist or arm 104 of the user, edges between pairs of the joints, range of angles between pairs of the edges, and a mesh including vertices and for each vertex, a relationship (e.g., distance) between the vertex and one or more joints. The electrical signals generated by the wearable device 100 are used to determine the hand position with reference to the hand shape model 280, such as the angles defined between pairs of edges between joints.

The hand shape model 280 defines a deformable shape and size of the hand 120. For example, hand shape model 280 includes a skeleton 282 and a mesh 284. The skeleton 282 includes hand features 286, representing nodes (joints) of the skeleton. At least some hand features 286 have fixed distances between other hand features 286, which is shown by the hand edges 288 of the skeleton 282. The hand edges 288 are models for bones of the hand 120, and the hand features 286 are models for joints that connect the bones.

Each hand feature 286 is associated with one or more degrees of freedom (DOF) defining the range of motion of the joint. For example, the hand feature at the wrist includes two degrees of freedom (e.g., pitch and yaw). In another example, the hand features 286 at each knuckle include two degrees of freedom (e.g., roll and yaw). In yet another example, the hand features 286 at each finger joint include one degree of freedom (e.g., yaw). Degrees of freedom may include rotational or translational degrees of freedom. Each degree of freedom may be associated with a range of values, such as may be defined by a maximum value and a minimum value, representing how much a joint can move along the degree of freedom. A hand position is defined by a particular state of the hand shape model 280. For example, a set of values for each degree of freedom of the hand features 286 may define a particular hand pose.

The mesh 284 of the hand shape model 280 defines the surface of the user hand model 280. The mesh 284 may include vertices, where each vertex is attached with a part of the skeleton 282, such as a hand feature 286 or location along a hand edge 288. The vertices when interconnected form a polygon mesh defining a model of the hand surface. For example, a vertex may have a predefined distance from an attached hand feature 286. If a hand feature 286 is moved, the attached vertices move accordingly such that the mesh 284 changes with movement of the skeleton 282. In some embodiments, vertices of the mesh 284 may be attached to more than one location of the skeleton 282.

Example Array and Checkerboard Pattern of Sensors

FIG. 3A is an example view of an array 108 of sensors 112, in accordance with an embodiment. Each sensor 112 is mounted on the wearable structure 116, as illustrated and described above with reference to FIG. 2A or 2B. The sensors 112 may be arranged in a rectangular grid, here having 3 rows and 5 columns. The array 108 may be mounted on the wearable structure 116 with the inertial measurement unit 128. In some embodiments, inertial measurement unit 128 is omitted from the wearable structure 116.

FIG. 3B is an example view of a checkerboard pattern array 300 of sensors 112, in accordance with an embodiment. Each sensor 112 is mounted on the wearable structure 116, as illustrated and described above with reference to FIG. 2A or 2B. The sensors 112 are arranged in an alternating checkerboard pattern 300. The checkerboard pattern array 300 can be mounted on the wearable structure 116 with the inertial measurement unit 128. In some embodiments, inertial measurement unit 128 is omitted from the wearable structure 116.

Figure 3C:
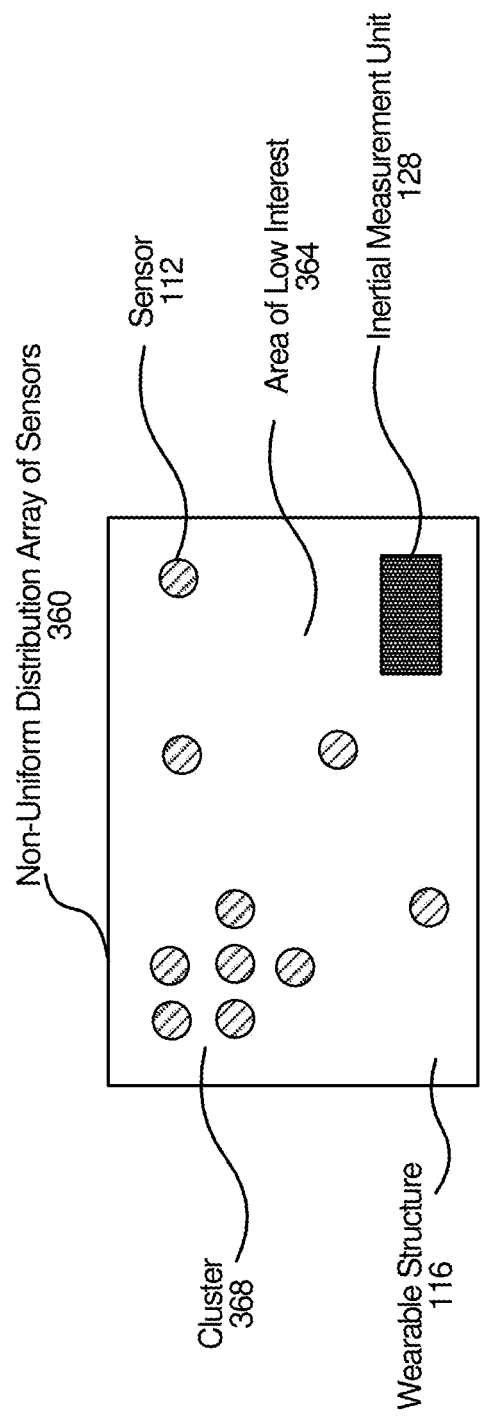
FIG. 3C is an example view of a non-uniform distribution of sensors, in accordance with an embodiment.

FIG. 3C is an example view of a non-uniform distribution array 360 of sensors 112, in accordance with an embodiment. Each sensor 112 is mounted on the wearable structure 116, as illustrated and described above with reference to FIG. 2A or 2B. The arrangement of sensors 112 on the wearable structure 116 does not follow a regular pitch value, and the sensors 112 are instead arranged to optimize detection of important structures in the arm 140. For example, a greater concentration of sensors 112 is located in a cluster 368 on the wearable structure 116 that covers locations of higher interest internal to the user's arm 104 (e.g., for extracting angles between joints and hand position), such as the carpal tunnel zone. A smaller concentration of sensors 112 is located in areas of lower interest 364.

Example System for Tracking Hand Position

Figure 4:
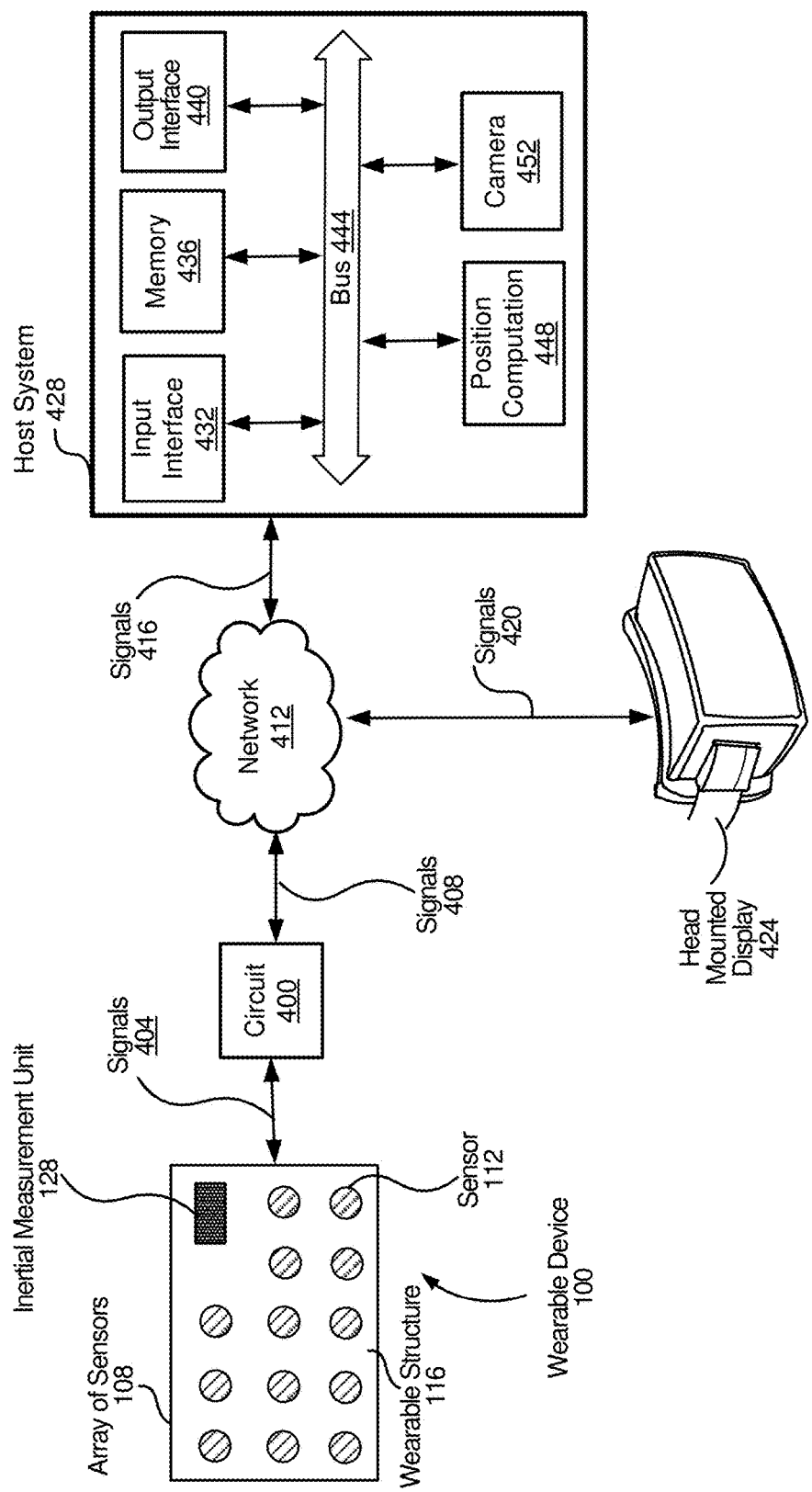
FIG. 4 is an example block diagram of a system for tracking changes in a user's hand position, in accordance with an embodiment.

FIG. 4 is an example block diagram of a system for tracking a user's hand position, in accordance with an embodiment. The system includes the wearable device 100, a host system 428, and a head-mounted display (HMD) 424. The wearable device includes the array of sensors 108 and a circuit 400 coupled to the array of sensors 108. The system illustrated in FIG. 4 may represent a virtual reality (VR) system, an augmented reality (AR) system, or a mixed reality (MR) system.

The array of sensors 108 may transmit the probe signals 212 to the user's arm 104 and receive the electrical signals 216 from the user's arm 104 as illustrated and described above with respect to FIGS. 2A and 2B. The array of sensors 108 transmits signals 404 to the circuit 400. The signals 404 may be the electrical signals 216. The circuit 400 transmits signals 408 to the host system 428. The signals 408 may be the electrical signals 216, information derived from the electrical signals 216, or a computed output describing the position of the user's hand 120 as calculated by the circuit 400 from the electrical signals 216. The information derived from the electrical signals 216 may include aggregate values based on an electrical impedance and a phase of the impedance measured between each pair of sensors 112. The electrical impedance is determined based on the probe signals 212 transmitted into the wrist or arm 104 of the user by the pair of sensors 112 and the electrical signals 216.

In some embodiments, the computed output may be any discrete, discontinuous representation of information describing the hand position of the user's hand 120 or analog signals representing changes in the position of the user's hand 120 using a continuous function. The wearable device 100, host system 428, and HMD 424 may communicate via a network 412, which may include any combination of local area and/or wide area networks, using both wired and/or wireless communication systems.

The host system 428 may include an input interface circuit 432, a memory 436, an output interface circuit 440, a position computation circuit 448, and a camera 452. The input interface circuit 432, memory 436, output interface circuit 440, position computation circuit 448, and camera 452 may communicate via a bus 444. The input interface circuit 432 receives the electrical signals 216 from the sensors 112. In some embodiments, the input interface circuit 432 receives the inertial signals from the inertial measurement unit 128 and/or receives images from one or more cameras.

The input interface circuit 432 is an interface circuit made of digital logic and/or analog circuitry to receive the electrical signals 216 from each sensor 112 of the array of sensors 108. The input interface circuit 432 may derive information from the electrical signals 216, such as the induction of voltages in the user's wrist or arm 104 self-induced by the magnetic fields of currents (inductance). The derived information may represent the electrostatic storage of charge in the internal structures of the user's wrist or arm 104 induced by voltages (capacitance). Deriving the information may include analyzing the electrical signals 216, such as by using phase determination, Hilbert transforms, etc., to determine an aggregate value. If the sensors 112 drive a DC signal into the user's wrist or arm 104, the derived information may represent an impedance with zero phase angle.

The derived information may represent a shape of a wave of the electrical signals 216. For example, a sigmoid shape may represent a single frequency while square pulses may represent a spectrum of frequencies. Deriving the information may include extracting the shape of the waveform of the received electrical signals 216, e.g., by using the Hough transform to detect the analytically defined shape of the waveform of the received electrical signals 216.

The derived information may represent a frequency-domain representation of the electrical signals 216. Deriving the information may include creating a frequency-domain representation of the electrical signals 216. Converting the electrical signals 216 from the time or space domain to the frequency domain, e.g., using a Fourier transform, such as fast Fourier transform (FFT) may be used to create a frequency-domain representation of the electrical signals 216. Example frequency domain information derived from the electrical signals 216 are a magnitude and a phase component of each frequency, which frequencies are present, which are missing, etc.

The derived information may represent a time-domain sample of the electrical signals 216. Deriving the information may include performing time-domain sampling of the electrical signals 216. Time-domain sampling reduces the electrical signals 216 to a set of discrete-time samples, such as a set of values at a point in time and/or space.

The memory 436 may be organized as a database, table, file, etc., stored on one or more of memory cards and computer hard drives. In some embodiments, the memory 436 stores the user hand shape model 280 for hand tracking, as illustrated and described in detail above with reference to FIG. 2C. The user hand shape model 280 defines the shape of the hand in 3-dimensional (3D) space, and is deformable to define the poses or positions of the hand 120. The user hand shape model 280 includes "hand features" that represent joints. These "hand features" 286 represent the user's joints themselves and are different from the "features 508" extracted by the position computation circuit 448 from the electrical signals 216. The features 508 extracted by the position computation circuit 448 from the electrical signals 216 are a set of values representing angles defined between hand features 286.

The hand features 286 may include degrees of freedom representing joint orientations. Accordingly, the hand position of a user, or changes in hand position, can be defined by a set of values representing joint orientations for each of the joints of a user hand shape model. A description of the user hand shape model 280 is in U.S. application Ser. No. 15/487,355, filed Apr. 13, 2017, which is incorporated in its entirety herein by reference. In some embodiments, the user hand shape model 280, customized for a user, may be generated as a set of principle component hand shape models, such as a weighted combination of ten principle component hand shape models. Each principle component hand shape model may control a linearly uncorrelated parameter of user hand shape. The use of a limited number of principle component hand shape models reduces determination of user hand shape to a smaller number of variables, and is described in U.S. application Ser. No. 15/487,361, filed Apr. 13, 2017, which is incorporated in its entirety herein by reference.

The position computation circuit 448 is coupled to the input interface circuit 432. The position computation circuit 448 computes, using features extracted from the electrical signals 216 as input to a machine learning model, an output that describes the position of the user's hand 120 and/or changes in hand position of the user's hand 120. For example, the machine learning model may define relationships between the electrical signals 216 as input and parameters of a hand shape model 280 as output. The position computation circuit 448 may be part of a central processing unit (CPU) that carries out the instructions of a computer program by performing the basic arithmetic, logical, control and input/output (I/O) operations specified by the instructions.

In some embodiments, one or more components of the host system 428 shown in FIG. 4 are located in the HMD 424 or the wearable device 100. For example, the computation circuit 448 may be located in the circuit 400, which may be part of the wearable device 100 or the HMD 424.

The output interface circuit 440 is coupled to the position computation circuit 448 and transmits the computed output that describes the hand position of the user's hand 120. For example, if the output interface circuit 440 is included in the circuit 400, it will communicate the computed output to the host system 428 or the HMD 424. If the output interface circuit 440 is included in the host system 428, it will communicate the computed output to the HMD 424.

As discussed in greater detail below in connection with FIG. 5, the position computation circuit 448 includes a machine learning model training and/or inferencing. For example, the machine learning model can be trained using training data sets of example features extracted from electrical signals, and corresponding expected outputs (e.g., a set of values defining the hand position). In some embodiments, at least a portion of the training data is generated in a training process where the user provides hand motions and gestures and that are captured using optical markers, as described in detail below with reference to FIG. 5.

The computed output may further describe forces exerted by a hand 120 of the user on objects touching the hand 120 of the user. The forces may be represented by the clenched state of muscles, tendons, and other internal structures in the user's wrist or arm 104 that are described by the computed output based on the electrical signals 216. For example, the sensors may measure the passive electrical properties of the clenched biological tissues exerting the forces on the objects based on the differences in resistivity between the tissue types and the different impedance spectra of skeletal muscle and other tissue.

The camera 452 may be a depth camera, a Red-Green-Blue (RGB) camera, an Infrared camera, or a camera mounted on the HMD 424. The camera 452 may capture images of the user's hand 120 by resolving distances based on the known speed of light or measuring the time-of-flight of a light signal between the camera and the user's hand 120 for each point of the image. The camera 452 may use independent charge coupled device (CCD) sensors to acquire the three RGB color signals for color image acquisitions of the user's hand 120. The camera 452 may be a thermographic camera (also called an Infrared camera or thermal imaging camera) that forms an image using infrared radiation using wavelengths as long as 14,000 nm (14 µm). In some embodiments, the camera 452 may capture ground truth hand positions for training data, as described below with reference to FIG. 5. Although the camera 452 may be used for training, it is not needed for inferencing changes in hand positions.

The HMD 424 is connected to the wearable device 100 and host system 428 via the network 412. The HMD 424 may include a display device, worn on a user's head or as part of a helmet that has an electronic display panel in front of the user's eyes to display computer-generated imagery (CGI) and/or live imagery from the physical world. The computed output that describes the hand position of the user's hand 120 generated from the electrical signals 216 of the array of sensors 108 may be translated into an action in a virtual scene presented to the user by the display panel. The HMD 424 receives signals 420 from the network 412 that may be the electrical signals 216 or the computed output corresponding to the hand position of the user's hand 120 after the circuit 400 or host system 428 has processed the electrical signals 216 to determine the position of the user's hand 120. In another example, the HMD 424 receives a video feed including a virtual scene that is generated based at least in part on changes to the position of the user's hand.

The input interface circuit 432 may receive image signals from the camera 452 or a camera mounted on the HMD 424. In some embodiments, during a forward pass for training the machine learning model, the position computation circuit 448 may determine comparison signals by comparing the image signals with the computed output. For example, the position computation circuit 448 may use image differencing to determine changes between the image signals and the computed output for the values of joint orientations of the user hand shape model 280. The position computation circuit 448 may further determine an error or loss function for the difference between the hand position as derived from the image and hand position as derived from the machine learning model. In a backward pass, the parameters of the machine learning model are updated to minimize the loss or error function. For example, a gradient is computed with respect to the parameters of the machine learning model, and the parameters are optimized toward a negative gradient direction. In some embodiments, the error between the image signals and the computed output may be transformed into an image based on the result. For example, the Hutchinson metric may be used to measure a discrepancy between the image signals and the computed output. The output interface circuit 440 may further transmit the comparison signals to the host system 428 or HMD 424. Other types of machine learning may be used. In some embodiments, the machine learning model uses linear regression rather than gradient-based optimization.

As described above, computing the output that describes the hand position of the user's hand 120 from the electrical signals 216 may be performed by the circuit 400, the host system 428, or circuits within the HMD 424 in different embodiments.

Example Machine Learning Training

Figure 5:
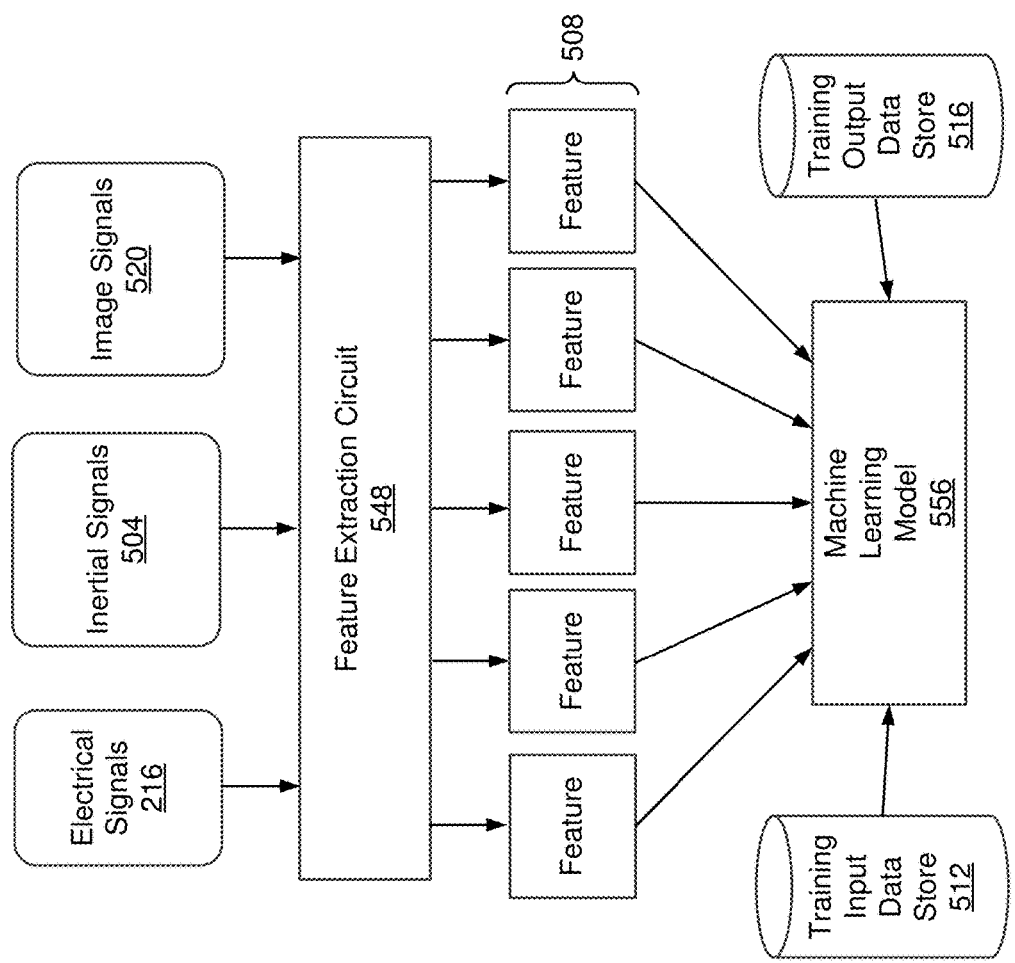
FIG. 5 is an example block diagram describing components associated with training a machine learning model, in accordance with an embodiment.

FIG. 5 is an example block diagram describing components associated with training a machine learning model 556, in accordance with an embodiment. In some embodiments, the process may have different and/or additional steps than those described in conjunction with FIG. 5. Some steps may be executed in parallel. Alternatively, some of the steps may be executed in parallel and some steps executed sequentially. Alternatively, some steps may execute in a pipelined fashion such that execution of a step is started before the execution of a previous step.

The block diagram illustrates a feature extraction circuit 548 and the machine learning model 556 within the position computation circuit 448. Information derived from the electrical signals 216, as described above with reference to FIG. 4, is received by the feature extraction circuit 548. The information may include impedance values and phase data of the electrical impedance measured between each pair of sensors 112. For example, the information may represent the electrical opposition that the internal structures 204 of the user's arm 104 present to the probe signals 212. The information may be a complex ratio of the electrical voltage signals 216 received to the probe current signals 212 transmitted, and may possess both magnitude and phase. If the number of sensors is denoted by N, this results in $N^2$ such impedance values. In some embodiments, the information includes a change in impedance over time for each pair of sensors (impedance/s). This impedance/s is indicative of changes in angles between joints in the user's hand 120 over time.

The feature extraction circuit 548 extracts features 508 from the electrical signals 216 or from the information derived from the electrical signals 216. In some embodiments, the features 508 include angles between joints defining the hand position of a hand 120 of the wrist or arm of the user. In this embodiment, the features 508 extracted are a set of values representing angles defined between hand features 286. The angles between joints can be defined with respect to a user hand shape model 280, and can be used to render a full high-fidelity hand that corresponds to the hand shape model 280 and hand position of the user.

In some embodiments, the features 508 include a reduced representation of a change in the hand position of a hand 120 of the wrist or arm 104 of the user. In another example, the features 508 extracted by the feature extraction circuit 548 are encoded using the reduced representation. The reduced representation defines a difference between a present hand position of the hand 120 of the wrist or arm 104 of the user and a previous hand position of the hand 120 of the wrist or arm 104 of the user. Temporal redundancy between neighboring image frames may be used to enable compression in the reduced representation. For example, the data transmitted by the sensors 112 may correspond to $N^2 \times 8$ image frames for time sampling, where the number of sensors 112 is N, and $N^2$ is the number of sensor pairs measuring electrical impedance of the user's arm 104.

In some embodiments, if a reduced representation of the changes in hand position is used, the data transmitted by the sensors 112 would include only motion vectors that describe the transformation from one image frame to another. The reduced representation 508 for the 8 image frames would therefore not include values for joints in each frame, but only the joint values that change between consecutive frames. Among other things, the processing and storage requirements for information related to hand position are reduced because only changes between frames are represented in data. Furthermore, the machine learning model 556 may be trained using compressed training data and can output compressed training data.

In some embodiments, the inertial measurement unit 128 generates inertial signals 504 corresponding to movement of the wearable device 100, as illustrated and described above with reference to FIG. 1. The position computation circuit 448 computes, using features derived from the inertial signals 504 in addition to the features from the signals 216 with the machine learning model 556, the output that describes the hand position of the hand 120 of the wrist or arm of the user.

In some embodiments, the camera 452 generates image signals 520 of joints and angles between fingers of the hand 120 of the wrist or arm 104 of the user. The position computation circuit 448 computes, using information derived from the image signals 520 in addition to the features from the signals 216 with the machine learning model 556, the output that describes the hand position of the hand 120 of the wrist or arm 104 of the user. The image signals 520 from the camera provide an expanded data set for extracting hand position features 508, and can increase the accuracy of the extraction.

In some embodiments, ground truth expected outputs describing forces exerted by the hand of the user on objects touching the hand of the user may be determined using an array of force sensors. The force data corresponds to the ground truth. The machine learning model 556 is trained to learn a continuous correlation between training inputs and hand exertion. In training, a user may grasp the force sensor array at a variety of different levels of grip force (i.e., hand exertion), and electrical data from the wearable device 100 is collected. The electrical signals 216 may change as the muscles, tendons, and other internal structures change under different levels of hand exertion. The force sensor data ("ground truth") is correlated to the electric signal data 216 using machine learning techniques, and a continuous model is created to estimate hand exertion from the electrical data 216.

In some embodiments, ground truth expected outputs describing forces exerted by the hand of the user may be determined without using force sensors. For example, subjective levels of hand exertion ("ground truth") may be correlated directly to the electrical signals 216. In training, a user may grasp objects with a "light," "medium," or "high," etc., grip force (i.e., hand exertion). The electrical signals 216 are then measured from the wearable device 100. The electrical signals 216 may change as the muscles, tendons, etc., change under different levels of hand exertion. The user-labeled hand exertions are correlated to the electric signal data 216. Machine learning techniques are used to create a model to estimate the hand exertion from the electrical data 216. An advantage of this approach is that overall system complexity is reduced by not requiring force sensors. In addition, this approach facilitates training using any objects/grasp instead of only a single force sensor instrumented object.

During training of the machine learning model 556, the feature extraction circuit 548 extracts features 508 to facilitate adjusting the parameters of the machine learning model 556. The extracted features 508 are used as inputs to the machine learning model 556, whose output can be compared with ground truth outputs stored in the training output data store 516. In particular, the electrical signals 216 or their extracted information is retrieved from the training input data store 512 and input to the feature extraction circuit 548 to generate the features 508.

The training input data store 512 may be organized as a database, table, file, etc., stored on one or more of removable or non-removable memory cards, computer hard drives, etc. In some embodiments, the training input data store 512 includes multiple data fields, each describing one or more attributes of the training input data. For example, the training input data store 512 may contain electrical signals 216, inertial signals 504, image signals 520, or their extracted values, which are used as inputs to the feature extraction circuit 548. The training output data store 516 stores expected hand positions of the user's hand 120 that correspond with the inputs stored in the training data input store. In some embodiments, the training input data store 512 and training output data store 516 store information captured from multiple users.

The machine learning model 556 is trained using training sets including information from the training input data store 512 and the training output data store 516. The training output data store 516 may be organized as a database, table, file, etc., stored on one or more of removable or non-removable memory cards, computer hard drives, etc. The training output data store 516 may store associations between known features 508 and known hand positions corresponding to the features 508. The training output data store 516 may store expected outputs, i.e., hand positions extracted from information from the inertial signals 504 or camera frames.

In some embodiments, the user's hand 120 whose position is to be tracked for training the machine learning model 556 is equipped with optical markers. Optical markers may be light reflectors (passive markers, e.g., retroreflectors) or light emitters (active markers, e.g., LEDs). To determine the orientation of the user's hand 120, several optical markers may be arranged at known geometries. A tracking camera may be used to scan and detect the light that comes from the optical markers. The images captured are processed to identify and calculate potential marker positions (in 2D image coordinates). This 2D data may be combined to calculate 3D positions of the optical markers. The results of such measurements (coordinates that describe the positions of the optical markers, and hence the position and orientation of the user's hand 120 carrying the markers) is stored in the training output data store 516 and used to train the machine learning model 556.

In some embodiments, the camera 452 generates image signals 520 corresponding to movement of the user's hand 120. A separate neural network may be trained to generate expected outputs derived from the image signals 520 that describe the hand position of the hand 120 of the wrist or arm 104 of the user. This process is described in U.S. application Ser. No. 15/487,355, filed Apr. 13, 2017, and U.S. application Ser. No. 15/487,361, filed Apr. 13, 2017, which are incorporated in their entirety herein by reference. These expected outputs may be stored in the training output data store 516. For example, the position computation circuit 448 may receive image signals 520 from the camera 452, as illustrated and described above with reference to FIG. 4, for training of the machine learning model 556. For each $N^2$ samples of impedance, the expected output corresponds to 8 camera frames representing captured changes in position of the hand 120 of the wrist or arm 104 of the user. The position computation circuit 448 may also create training data sets for the training output data store 516 by receiving image signals 520 from a camera mounted on an HMD.

In some embodiments, the inertial measurement unit 128 generates inertial signals 504 corresponding to movement of the wearable device 100. The machine learning model 556 is trained to generate expected outputs derived from the inertial signals 504 that describe the hand position of the hand 120 of the wrist or arm 104 of the user. These expected outputs may be stored in the training output data store 516.

The objective of training the machine learning model 556 is to enable it to perform accurately on new, unseen inputs after having experienced the inputs and expected results of the training data sets. Several different approaches to training may be used, including decision tree learning, association rule learning, neural networks, deep learning, inductive logic programming, support vector machines, clustering, Bayesian networks, reinforcement learning, and representation learning, etc. In a gradient-based optimization approach, an error in a cost function (in a forward pass) and the gradient with respect to the parameters of the model may be computed; then the parameters may be moved towards the negative gradient direction (in a backward pass). In a neural network, there may be multiple layers of cost functions; the training is performed for each layer. In linear regression, closed form solutions are computed and the output may be directly written out.

In some embodiments, the training of the machine learning model 556 may be accomplished in two passes. First, in a forward pass, training features 508 are extracted from impedances derived from the electrical signals 216 and the inertial signals 504. In this manner, information derived from the electrical signals 216 is input into the feature extraction circuit 548. The output of the feature extraction circuit 548 is the set of features 508. The features 508 correspond to angles between joints defining hand positions. In some embodiments, the features correspond to a reduced representation of a change in hand position of the hand 120 of the wrist or arm 104 of the user. Each feature 508 is therefore an output extracted from a set of inputs 216 and 504. The position computation circuit 448 may determine an error or loss function between each feature 508 and the expected outputs (e.g., from camera 452) stored in the training data output store 516. Second, in a backward pass, the parameters of the machine learning model 556 are adjusted to minimize the error or loss function. In the next forward pass, this updated machine learning model 556 is used. In this manner, large volumes of training sets may be collected across multiple users.

In some embodiments, the machine learning model 556 may be a recurrent neural network (RNN) model, which is a class of artificial neural network where connections between units form a directed cycle. This creates an internal state of the machine learning model 556 which allows it to exhibit dynamic temporal behavior. In this embodiment, the position computation circuit 448 can use its internal memory to process arbitrary sequences of inputs, such as features extracted from the electrical signals 216.

In some embodiments, dimensionality reduction (e.g., via linear discriminant analysis (LDA), principle component analysis (PCA), or the like) may be used to reduce the dimensions of a full hand shape model to reduce the amount of data in the features 508 and reduce the complexity of the machine learning problem. PCA may applies dimensionality reduction (e.g., via linear discriminant analysis (LDA), principle component analysis (PCA), or the like) to reduce the amount of data in the feature vector 410 to a smaller, more representative set of data. PCA is a statistical procedure that uses an orthogonal transformation to convert a set of observations of possibly correlated variables into a set of values of linearly uncorrelated variables called principal components. The number of principal components is less than or equal to the smaller of the number of original variables or the number of observations.

For example, if the full hand shape model has 22 joint angles, expected outputs corresponding to the full hand shape model may be measured by the camera 452 as image signals 520. These expected outputs may be reduced to a smaller model (e.g., 10 features) using PCA and stored in the training output data store 516. The machine learning model 556 may be trained using training sets of electrical signals 216, inertial signals 504, image signals 520, or their extracted values corresponding to the reduced model (10 features) stored in the training input data store 512. In the online prediction or inferencing process, the input data is used by the trained model to predict an output corresponding to the reduced hand shape model (10 features). The output corresponding to the reduced hand shape model (10 features) may then be projected back to the full hand shape model (22 joint angles) for use.

In the online prediction or inferencing process, the position computation circuit 448 receives inputs 216 and/or 504 from the sensors 112 and the inertial measurement unit 128 (e.g., in a live environment) and uses the extracted features 508 with the trained machine learning model 556 to compute the output. The benefits and advantages of this method are that a small set of input data (electrical signals 216) is generated for the user. No camera or image processing is needed, although in embodiments, image signals may be used either as inputs to the model 556, in training the model 556, or for calibration of the system to determine errors between the output computed by the model 556 and live image signals.

Example Process for Tracking Hand Position

Figure 6:
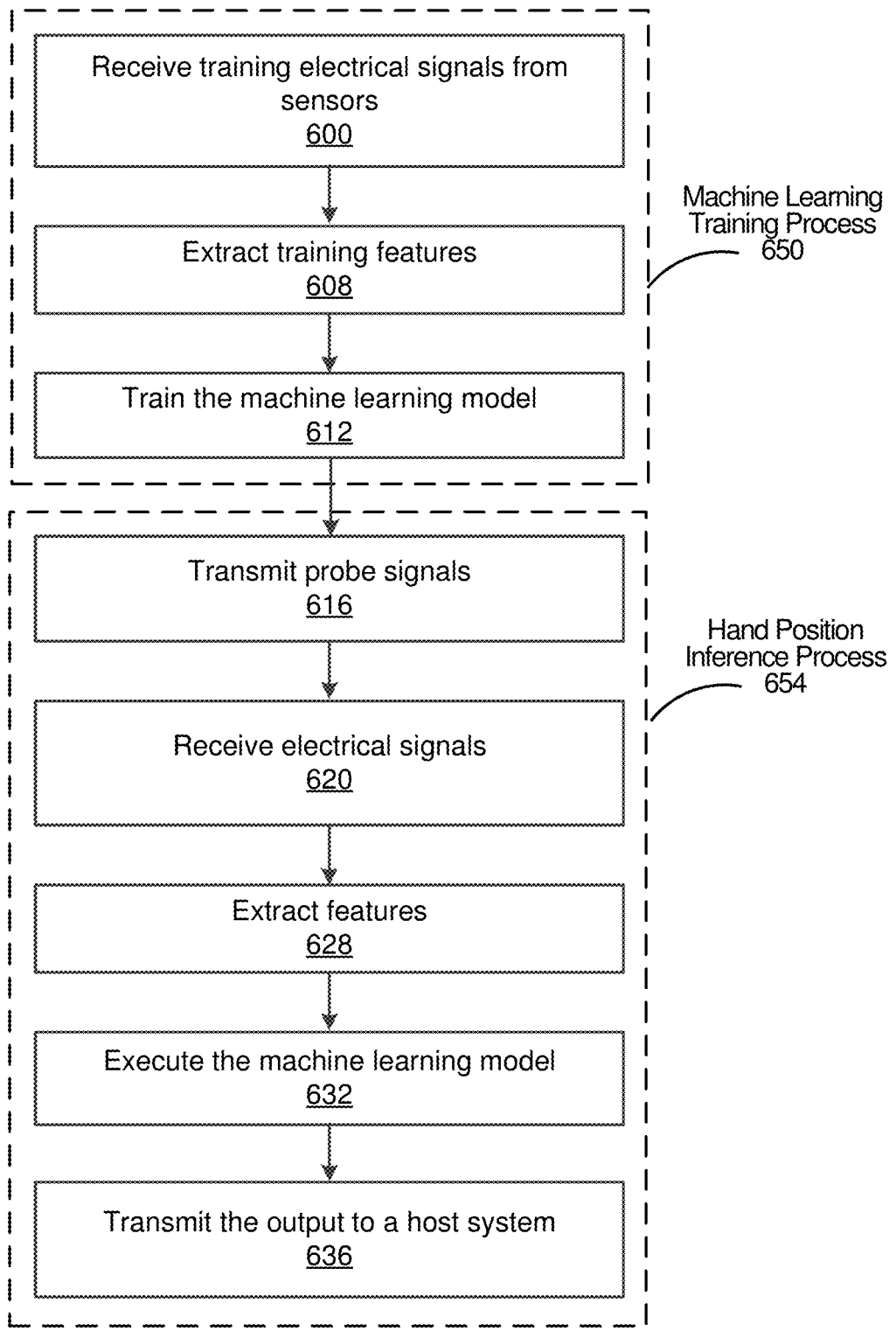
FIG. 6 is an example process for tracking a user's hand position, in accordance with an embodiment.

FIG. 6 is a flowchart illustrating a process 650 for training the machine learning model 556 to track the user's hand position based on training electrical signals, and a process 654 for inferring the user's hand position based on electrical signals 216, in accordance with an embodiment. In some embodiments, the processes may have different and/or additional steps than those described in conjunction with FIG. 6. Steps of the processes may be performed in different orders than the order described in conjunction with FIG. 6. Some steps may be executed in parallel. Alternatively, some of the steps may be executed in parallel and some steps executed sequentially. Alternatively, some steps may execute in a pipelined fashion such that execution of a step is started before the execution of a previous step.

In the machine learning training process 650, the circuit 400 or host system 428 receives 600 the electrical signals 216 from the sensors 112 arranged at different locations on the wearable structure 116 worn around at least a portion of a wrist or arm 104 of the user. Each sensor 112 measures the electrical signals 216 corresponding to movement of structures within the wrist or arm 104 of the user.

The feature extraction circuit 548 extracts 608 training features 508 from the electrical signals 216. In some embodiments, the impedance and phase of the electrical impedance measured between each pair of sensors 112 is derived. In some embodiments, the information derived from the measured electrical signals 216 includes a change in impedance over time for each pair of sensors (impedance/s). The features 508 extracted from the electrical signals 216 or from the information derived from the electrical signals 216, may include angles between joints defining positions of a hand 120 of the wrist or arm 104 of the user, and a reduced representation of a change in hand position of a hand 120 of the wrist or arm 104 of the user.

The process 650 is a training process used to generate the machine learning model 556, such as by deriving parameters for neural network layers that implement the machine learning model 556. In the process 650, the machine learning model 556 is trained 612 using the extracted features 508, information corresponding to known hand positions from the training input data store 512, and expected outputs from the training output data store 516 to determine the hand position of a hand 120 of the user based on the features 508. To create training sets, the position computation circuit 448 may receive image signals 520 from the camera 452, as illustrated and described above with reference to FIGS. 4 and 5. For each $N^2$ samples of impedance, the expected output may correspond to 8 camera frames representing captured positions of the hand 120 of the wrist or arm 104 of the user. Subsequent to the training process 650, the inferencing process 654 can be performed for real-time user hand tracking for a user.

In the hand position inference process 654, the sensors 112 in the wearable device 100 transmit 616 probe signals 212 to the internal structures 204 of the user's arm 104, as illustrated and described above with respect to FIG. 2A. The input interface circuit 432 receives 620 electrical signals 216 from the sensors 112. The electrical signals 216 correspond to movement of structures within the wrist or arm 104 of the user.

The feature extraction circuit 548 extracts 628 features 508 from information such as impedance values derived from the electrical signals 216. The position computation component 448 transmits the features 508 for inferencing to the machine learning model 556 to generate 632 an output that describes a hand position of the user's hand 120. The machine learning model 556, having been trained using similar feature sets, is applied to the features 508 extracted during the inferencing.

In some embodiments, classifications, binaries, or other scores, based on the new features, are determined using the machine learning model 556. In some embodiments, a score associated with each user hand position in the training output data store 516 is determined. The score associated with each user hand position may indicate a likelihood that the electrical signals 216 correspond to that user hand position.

In some embodiments, a score associated with each user hand position is determined by evaluating an expression representing a weighted aggregate of scores associated with features 508. The weight associated with a feature may be predetermined, for example, configured by an expert user. Features that are most determinative of certain hand positions for a particular user may be weighted more. The output interface circuit 440 transmits 636 the computed output to the host system 428 or the HMD 424.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

The invention claimed is:

1. A system, comprising:
a wearable device, comprising sensors arranged in a two-dimensional pattern on the wearable device, each sensor configured to measure electrical signals transmitted through a wrist or arm of a user, the electrical signals comprising information of values of an electrical impedance; and
a position computation circuit coupled to the sensors, the position computation circuit configured to use a machine learning model to receive the values of the electrical impedance derived from the electrical signals measured by the sensors arranged in the two-dimensional pattern and transmitted from the wrist or arm of the user to compute an output that describes a hand position of a hand of the wrist or arm of the user.

2. The system of claim 1, wherein the position computation circuit is located on or within the wearable device.

3. The system of claim 1, wherein the position computation circuit is located on or within a host system external to the wearable device.

4. The system of claim 1, wherein each sensor comprises an electrode and a conductive agent located between the electrode and the wrist or arm of the user, each sensor further configured to transmit an alternating current (AC) signal, a direct current (DC) signal, or a wide-bandwidth AC signal including a plurality of frequencies into the wrist or arm of the user.

5. The system of claim 1, wherein each electrical signal comprises one of:
a voltage and a phase of the voltage;
an electric current and a phase of the electric current; or
a magnitude of a DC signal.

6. The system of claim 1, wherein the two-dimensional pattern is a grid array or a checkerboard pattern.

7. The system of claim 1, wherein the machine learning model is configured to use information derived from the electrical signals to compute the output, the information comprises one or more of:
aggregate values based on the electrical impedance, the electrical impedance measured between each pair of the sensors, the electrical impedance determined based on probe signals transmitted into the wrist or arm of the user by the pair of sensors and the electrical signals;
a shape of a wave of the electrical signals;
a frequency-domain representation of the electrical signals; and
a time-domain sample of the electrical signals.

8. The system of claim 1, wherein the position computation circuit is further configured to extract features from information derived from the electrical signals, the features comprising one or more of:
angles between joints defining the hand position of a hand of the wrist or arm of the user; and
a reduced representation of a change in the hand position of a hand of the wrist or arm of the user, the reduced representation defining a difference between a present hand position of the hand of the wrist or arm of the user and a previous hand position of the hand of the wrist or arm of the user.

9. The system of claim 1, wherein each sensor is further configured to transmit a probe signal into the wrist or arm of the user by varying one or more of:
a time period of the probe signal;
an amplitude of the probe signal; and
a phase of the probe signal.

10. The system of claim 1, wherein a first sensor is configured to transmit a probe signal into the wrist or arm of the user by staggering transmission of the probe signal with respect to transmission of other probe signals by other sensors.

11. The system of claim 1, further comprising:
an inertial measurement unit configured to generate inertial signals corresponding to movement of the wearable device and the user's arm, wherein the position computation circuit is further configured to compute, using information derived from the inertial signals with the machine learning model, the output that describes the hand position of the hand of the wrist or arm of the user.

12. The system of claim 11, wherein the inertial measurement unit comprises one or more of:
a gyroscope;
an accelerometer; and
a magnetometer.

13. The system of claim 1, further comprising:
one or more cameras configured to generate image signals of the hand of the wrist or arm of the user from one or more angles, wherein the position computation circuit is further configured to compute, using information derived from the image signals with the machine learning model, the output that describes the hand position of the hand of the wrist or arm of the user.

14. The system of claim 13, wherein one of the cameras is a depth camera, a Red-Green-Blue (RGB) camera, an Infrared camera, or a camera mounted on a head-mounted display (HMD).

15. The system of claim 1, further comprising:
an inertial measurement unit configured to generate inertial signals corresponding to movement of the wearable device, wherein the position computation circuit is further configured to train the machine learning model to generate, using information derived from the inertial signals, the output that describes the hand position of the hand of the wrist or arm of the user.

16. The system of claim 1, further comprising:
one or more cameras configured to generate image signals of the hand of the wrist or arm of the user, wherein the position computation circuit is further configured to train the machine learning model to generate, using information derived from the image signals with the machine learning model, the output that describes the hand position of the hand of the wrist or arm of the user.

17. The system of claim 1, wherein the computed output further describes forces exerted by the hand of the wrist or arm of the user on objects touching the hand of the wrist or arm of the user.

18. The system of claim 1, wherein the position computation circuit is further configured to:
receive image signals from a camera mounted on an HMD;
determine comparison signals by comparing the image signals with the computed output; and
transmit the comparison signals to a host system.

19. The system of claim 1, wherein the computed output comprises parameters of a hand shape model, the parameters corresponding to:
a plurality of joints of the hand of the wrist or arm of the user;
a plurality of edges between pairs of the joints;
a plurality of angles between pairs of the edges;
a mesh comprising a plurality of vertices and for each vertex, a distance between the vertex and one or more joints.

20. An HMD, comprising:
a position computation circuit coupled to sensors arranged in a two-dimensional pattern on a wearable device, each sensor configured to measure electrical signals transmitted from a wrist or arm of a user, the electrical signals comprising information of values of an electrical impedance, the position computation circuit configured to use a machine learning model to receive the values of the electrical impedance derived from the electrical signals measured by the sensors arranged in the two-dimensional pattern and transmitted from the wrist or arm of the user to compute an output that describes a hand position of a hand of the wrist or arm of the user; and
a display panel configured to receive the computed output from the position computation circuit.

21. The HMD of claim 20, further comprising:
a camera configured to generate image signals of the hand of the wrist or arm of the user, wherein the position computation circuit is further configured to compute, using information derived from the image signals with the machine learning model, the output that describes the hand position of the hand of the wrist or arm of the user.

22. The system of claim 21, wherein the camera is a depth camera, a Red-Green-Blue (RGB) camera, an Infrared camera, or a camera mounted on the HMD.

23. The HMD of claim 20, further comprising:
a camera configured to generate image signals of the hand of the wrist or arm of the user, wherein the position computation circuit is further configured to train the machine learning model to generate, using information derived from the image signals with the machine learning model, the output that describes the hand position of the hand of the wrist or arm of the user.

24. The HMD of claim 23, wherein the position computation circuit is further configured to:
determine comparison signals by comparing the image signals with the computed output; and
transmit the comparison signals to a host system.

25. A method, comprising:
receiving training electrical signals from sensors arranged in a two-dimensional pattern on a wearable device, the training electrical signals transmitted from a wrist or arm of a user;
extracting training features from the training electrical signals;
training a machine learning model using the extracted training features to determine a hand position of a hand of the wrist or arm of the user;
receiving electrical signals from the sensors, the electrical signals transmitted from the wrist or arm of a user, the electrical signals comprising information of values of an electrical impedance;
extracting features from the electrical signals, the features comprising the values of the electrical impedance;
transmitting the features, which are extracted from the electrical signals measured by the sensors arranged in the two-dimensional pattern, to the machine learning model to compute an output that describes a hand position of the hand of the wrist or arm of the user; and
transmitting the output to a host system.

26. The method of claim 25, further comprising:
transmitting an AC signal, a DC signal, or a wide-bandwidth AC signal comprising a plurality of frequencies into the wrist or arm of the user.

27. The method of claim 25, wherein the features extracted from the electrical signals comprise one or more of:
aggregate values based on the electrical impedance, the electrical impedance measured between each pair of the sensors, the electrical impedance determined based on probe signals transmitted into the wrist or arm of the user by the pair of sensors and the electrical signals;
a shape of a wave of the electrical signals;
a frequency-domain representation of the electrical signals; and
a time-domain sample of the electrical signals.

28. The method of claim 27, wherein the features extracted from the electrical signals further comprises one or more of:
angles between joints defining the hand position of the hand of the wrist or arm of the user; and
a reduced representation of a change in the hand position of the hand of the wrist or arm of the user, the reduced representation defining a difference between a present hand position of the hand of the wrist or arm of the user from a previous hand position of the hand of the wrist or arm of the user.

29. The method of claim 25, further comprising transmitting a probe signal into the wrist or arm of the user by varying one or more of:
- a time period of the probe signal;
- an amplitude of the probe signal; and
- a phase of the probe signal.

30. The method of claim 25, further comprising:
transmitting, by a first sensor, a probe signal into the wrist or arm of the user by staggering transmission of the probe signal with respect to transmission of other probe signals transmitted by other sensors.

31. The method of claim 25, further comprising:
generating, by an inertial measurement unit, inertial signals corresponding to movement of the wearable device; and
computing, using information derived from the inertial signals with the machine learning model, the output that describes the hand position of the hand of the wrist or arm of the user.

32. The method of claim 25, further comprising:
generating, by one or more cameras, image signals of the hand of the wrist or arm of the user; and
computing, using information derived from the image signals with the machine learning model, the output that describes the hand position of the hand of the wrist or arm of the user.

33. The method of claim 25, further comprising:
generating, by an inertial measurement unit, inertial signals corresponding to movement of the wearable device; and
training the machine learning model to generate, using information derived from the inertial signals, the output that describes the hand position of the hand of the wrist or arm of the user.

34. The method of claim 25, further comprising:
generating, by one or more cameras, image signals of the hand of the wrist or arm of the user; and
training the machine learning model to generate, using information derived from the image signals, the output that describes the hand position of the hand of the wrist or arm of the user.

35. The method of claim 25, further comprising:
receiving, from one or more cameras, image signals of the hand of the wrist or arm of the user;
determining comparison signals by comparing the image signals with the computed output; and
transmitting the comparison signals to a host system.

* * * * *

UNITED STATES PATENT AND TRADEMARK OFFICE
CERTIFICATE OF CORRECTION

PATENT NO. : 10,481,699 B2
APPLICATION NO. : 15/661317
DATED : November 19, 2019
INVENTOR(S) : Beipeng Mu et al.

Page 1 of 1

It is certified that error appears in the above-identified patent and that said Letters Patent is hereby corrected as shown below:

Column 22, Line 4, Claim 22, delete "system" and insert -- HMD --.

Column 22, Line 47, Claim 27, after "of" insert -- : --.

Signed and Sealed this
Seventh Day of July, 2020

Andrei Iancu
*Director of the United States Patent and Trademark Office*